United States Patent [19]

Wanser

[11] Patent Number: 4,726,847
[45] Date of Patent: Feb. 23, 1988

[54] COPPER PHTHALOCYANINE PIGMENT SYSTEMS

[75] Inventor: Calvin C. Wanser, S. Glens Falls, N.Y.

[73] Assignee: Ciba-Geigy Corporation, Ardsley, N.Y.

[21] Appl. No.: 843,867

[22] Filed: Mar. 24, 1986

Related U.S. Application Data

[63] Continuation of Ser. No. 587,091, Mar. 7, 1984, abandoned.

[51] Int. Cl.$^4$ .................................................. C09B 47/28
[52] U.S. Cl. ............................. 106/308 N; 106/308 S; 106/309
[58] Field of Search ................ 106/308 N, 308 S, 23, 106/309; 260/245.72, 245.77, 245.78, 245.82

[56] References Cited

U.S. PATENT DOCUMENTS

| | | | |
|---|---|---|---|
| 4,155,773 | 5/1979 | Ferrill, Jr. | 106/309 |
| 4,221,606 | 9/1980 | Funatsu et al. | 106/308 S |
| 4,522,654 | 6/1985 | Chisuette et al. | 106/308 N |

OTHER PUBLICATIONS

Derwent Abstract Accession No. 75-28407w/17, Japanese Patent No. J75008091, Apr. 2, 1975.

*Primary Examiner*—Amelia Burgess Yarbrough
*Attorney, Agent, or Firm*—Harry Falber

[57] ABSTRACT

Copper phthalocyanine pigment systems with improved rheological and optical performance characteristics comprising copper phthalocyanine or halogen-substituted copper phthalocyanines blended with sulfonated copper phthalocyanine and provided with an anionic-cationic surfactant coating, and a process for the preparation thereof.

9 Claims, No Drawings

COPPER PHTHALOCYANINE PIGMENT SYSTEMS

This application is a continuation, of application Ser. No. 587,091, filed Mar. 7, 1984, now abandoned.

Metal phthalocyanine pigments are a well known class of pigments and are conventionally synthesized by heating a phthalonitrile with a metal or metal salt or by heating a mixture of a phthalic anhydride, urea and a metal salt or powdered metal. The syntheses are carried out in the melt without any diluent or with the raw materials in suspension in an inert high boiling solvent. The metal phthalocyanine crudes obtained from these syntheses require additional treatments and particularly particle size reduction before acceptable pigmentary properties are attained.

The resulting metal phthalocyanines are useful in a variety of applications and particularly as colorants for printing inks, coating compositions, plastics and the like. Of special interest is the use of such phthalocyanine pigments in high solids lacquer and enamel systems for automotive metallic coatings. Such pigments must exhibit optimum optical properties in providing the desired metallic appearance, avoid geometric metamerism (i.e. minimal changes in hue at various viewing angles, be capable of high loading in the coating system and, of particular importance, exhibit sufficiently low viscosities to facilitate the coating application. Phthalocyanine pigments currently available are deficient in some or all of these characteristics, such pigments primarily requiring the improved rheological properties.

It is, accordingly, the primary object of this invention to provide metal phthalocyanine pigment systems which exhibit improved rheological and optical properties.

It is a further object to provide such pigments for use in lacquer and enamel automotive coating systems.

It is another object to provide an appropriate process for the preparation of such improved pigment systems.

Various other objects and advantages of this invention will become apparent from the following description thereof.

In accordance with this invention, it has now been surprisingly found that the rheological and optical properties of metal phthalocyanine pigments can be substantially improved by combining the metal phthalocyanine with a sulfonated copper phthalocyanine to the prescribed sulfonic acid concentration and then coating the pigment with an anionic-cationic surfactant mixture. The resulting pigment system is especially useful in automotive metallic coatings in view of its low viscosity, high pigment loading capability and improved optical qualities. The process for preparing such improved systems generally comprises the acid pasting of the crude copper phthalocyanine, hydrolyzation and processing the acid paste, neutralization of the resulting presscake, reslurrying and milling of the presscake, addition of the sulfonated copper phthalocyanine, addition of the surfactant mixture, insolubilization of the latter ingredients and, finally, pressing, washing, drying and grinding of the treated slurry.

The invention applies to any crude of a metal phthalocyanine as, for example, crudes of copper, nickel, cobalt or zinc, unsubstituted or nuclear substituted phthalocyanines. The invention is particularly useful for crudes of copper phthalocyanine and the halogen-substituted copper phthalocyanines, with added preference for chlorinated copper phthalocyanines containing up to about 20%, by weight, of chlorine.

The sulfonated copper phthalocyanines are well known and may, for example, correspond to the formula $CuPc(SO_3H)_n$ wherein $n = 1-4$.

As to the surfactant blend utilized as the coating herein, it may comprise a blend of one or more anionic surfactants with one or more cationic surfactants.

Examples of anionic surfactants are water-soluble salts, particularly alkali metal salts of sulfate esters or sulfonates containing higher aliphatic hydrocarbon radicals of 8 or more carbon atoms (e.g. 8–22 carbon atoms); such as sodium or potassium sulfates of higher alcohols (e.g. sulfates of alkanols such as coco alcohol or sulfates of other higher alcohols such as the higher alkyl phenolethylene oxide ether sulfates or the higher fatty acid monoglyceride sulfates or the ethoxylated higher fatty alcohol sulfates), sodium or potassium salts of higher sulfonic acids (e.g. of higher alkylbenzene sulfonic acids such as pentadecyl benzene sulfonic acid, or of isothionate esters of higher fatty acids such as coconut oil fatty acids). The sodium alkyl aryl sulfonates are preferred.

Examples of cationic surfactants are fatty amines condensed with ethylene oxide, long chain primary amines and quaternary ammonium compounds in which there is a quaternary nitrogen atom directly linked to a carbon atom of a hydrophobic radical of at least ten carbon atoms (e.g. a long chain alkyl radical or an alkyl aryl radical, in which there are 10–12 carbon atoms), three valences of the nitrogen atom being also directly linked to other carbon atoms which may be in separate radicals (such as alkyl, particularly lower alkyl, or aralkyl radicals) or in a cyclic structure including the quaternary nitrogen atom (as in a morpholine, pyridine, quinoline or imidazoline ring); stearyl trimethyl ammonium chloride being a specific example. The ethoxylated amines are preferred.

In terms of concentrations of these required ingredients, the sulfonated copper phthalocyanine is added in amounts to adjust the composition to a 0.1 to 2.0%, by weight, sulfonic acid ($SO_3H$) content, and preferably a 0.5 to 0.75% $SO_3H$ content, with 0.5% being particularly preferred. The anionic surfactant is present in concentrations ranging from 0.008–0.035 parts, by weight, per part of pigment (metal phthalocyanine plus sulfonated copper phthalocyanine), and preferably 0.017 parts, while the cationic surfactant is present in concentrations ranging from 0.06–0.27 parts per part of pigment, and preferably 0.131 parts.

The process for preparing the coated pigments of this invention comprises pasting the crude metal phthalocyanine by intimately contacting the crude in the absence of shear with sulfuric acid having a concentration of about 94 to about 96% in an amount equal to about 12 to about 16 parts of acid per part of pigment, and preferably 14 parts. The time of contact with the acid should be sufficient to wet out the crude and form a paste-like mass. The exact time employed will, of course, vary depending upon such factors as the amount of acid used, method of contact, temperature of the acid, and the particular crude. Usually, the time will vary from about 1 to about 3 hours and preferably about 2 hours. Extended contact periods are not necessary and are usually not recommended since in some cases prolonged contact may adversely effect the development of color strength and transparency. The temperature at contact is not critical and can vary over a considerable range. It is preferred, however, to operate at a temperature range of from about 60° to 85° C. and preferably from about 75°–80° C.

Following contact of the crude and acid to form a paste, the paste is hydrolyzed in water at 20° C.–30° C., pressed and washed. The resulting presscake containing residual sulfuric acid is reslurried and neutralized with a base such as alkali and ammonium hydroxides at a temperature of from 35°–80° C., and preferably 60°–65° C. Thereafter, the neutralized slurry is contacted with an organic solvent/water emulsion utilizing such aromatic organic solvents as xylene, toluene, benzene and petroleum solvents, and cationic, anionic, nonionic and/or amphoteric surfactants, preferably nonionic surfactants, in concentrations of 0.04 to 0.10 parts, by weight, per 100 parts of pigment, and preferably 0.08 parts. The emulsified slurry is then colloid milled and heated with steam at a temperature of 60°–93° C., preferably 85°–90° C., for a period of about two hours.

The milled slurry is then cooled to about 60° C. whereupon the sulfonated copper phthalocyanine and the anionic-cationic surfactant are added with stirring at a temperature of 35°–80° C. and preferably at 60°–65° C. Stirring continues for about 30 minutes. The sulfonated copper phthalocyanine and anionic surfactant are then insolubilized to form the desired coating by the addition of an insolubilizing agent such as alkaline-earth halides including barium chloride or calcium chloride. Stirring is continued and the treated slurry is washed, dried and ground according to conventional techniques.

The metal phthalocyanine pigments thus produced possess outstanding tinctorial strength. Of particular value, the pigments exhibit excellent rheological and optical properties to facilitate their use in high solids lacquer and enamel coating systems for automotive metallic coatings. These metallic lacquers are well known in the art and frequently are based on acrylic or alkyd resin systems. The coating systems will generally contain from 10 to 12%, by weight, of pigment. Typical viscosities for these coating systems containing the instant coated pigments range from 750–1000 centipoises at a 50 RPM shear rate at 25° C.

The invention is further illustrated by the following examples. All parts and percentages given are by weight unless otherwise indicated.

EXAMPLE 1

This example illustrates the preparation of a typical pigment system of this invention.

Chlorinated copper phthalocyanine (15% chlorine), was acid pasted in 96% sulfuric acid in a conventional manner. After hydrolysis, pressing and washing, the acid presscake (200 grams of real pigment) was reslurried in water at 60° C. and the slurry adjusted to a pH of 8.5 with ammonium hydroxide. Thereafter, 16 grams of a xylene-water emulsion based on a nonionic surfactant (ALROSOL 0 from CIBA-GEIGY CORP.) was stirred in and the emulsified slurry passed through a colloid mill and heated with steam at 85° C. for two hours. The temperature was dropped to 60° C. whereupon sulfonated copper phthalocyanine (8.7 grams dry basis - 12.0% $SO_3H$) was added to achieve a 0.5% sulfonic acid concentration. Stirring was continued for thirty minutes. A mixture of 3.5 grams sodium alkyl aryl sulfonate (ALKANOL WXN from DuPont) and 27.3 grams ethoxylated amine (ETHOMEEN S/12 from Armak Corp.) were added in dropwise fashion. Stirring was continued for thirty minutes whereupon 3.8 grams of barium chloride as a 10% aqueous solution was added to insolubilize the anionic surfactant and the sulfonated copper phthalocyanine. The treated slurry was stirred for 15 minutes, filtered, washed, dried at 70° C. and then ground through a 8 mm. sieve giving a pigmentary copper phthalocyanine pigment.

EXAMPLE 2

The procedure of Example 1 was repeated utilizing following ingredients:

| | grams | | | |
|---|---|---|---|---|
| | A* | B* | C | D |
| chlorinated copper phthalocyanine (15% Cl) | 200 | 200 | 45.8 | 200 |
| sulfonated copper phthalocyanine | — | — | 4.2 | 4.3 |
| ALKANOL WXN | 3.3 | — | 0.83 | 3.4 |
| ETHOMEEN S/12 | 26.2 | — | 6.55 | 26.7 |
| 10% $BaCl_2$ aqueous solution | 4.0 | — | 17.0 | 20.0 |
| $SO_3H$ content (%) | — | — | 1.0 | 0.25 |

*control

EXAMPLE 3

This example illustrates the rheological properties of the pigments of this invention.

The pigments of the previous examples were blended into a high solids lacquer formulation based on a high solids resin at the indicated pigment load. The pigment was thoroughly dispersed. The viscosity of the resulting lacquers was then determined initially and after four days aging at 60° C., utilizing a Brookfield HAT Viscometer with a #5 spindle at 25° C.

| | | Viscosity (cps.) | | | |
|---|---|---|---|---|---|
| | | Initial | | Aged | |
| Pigment | Load (%) | 20 rpm | 50 rpm | 20 rpm | 50 rpm |
| Ex. 2A | 10 | 2800 | 1264 | 2360 | 1256 |
| Ex. 2B | 10 | 4600 | 2064 | 4620 | 2112 |
| Ex. 1 | 10 | 1720 | 864 | 1640 | 816 |
| Ex. 2C* | 10 | 600 | 384 | 240 | 248 |
| Ex. 2D | 10 | 2400 | 1120 | 2040 | 976 |

*#4 spindle

These data clearly illustrate the excellent rheological properties.

In addition, a visual inspection of the respective lacquers revealed a more intense, cleaner coloration for the lacquers utilizing the pigment systems of this invention.

In summary, this invention is seen to provide copper phthalocyanine pigment systems with improved performance characteristics. Variations may be made in proportions, procedures and materials without departing from the scope of the invention as defined by the following claims.

What is claimed is:

1. A metal phthalocyanine pigment system consisting essentially of a blend of an unsubstituted metal phthalocyanine or a halogen nuclear-substituted metal phthalocyanine with a sulfonated copper phthalocyanine of the formula $CuPc(SO_3H)_n$ wherein n is 1 to 4, coated with a combination of anionic and cationic surfactants, said sulfonated copper phthalocyanine being present in sufficient amount to provide said pigment with a 0.1–2.0%, by weight, sulfonic acid content, said anionic surfactant being present in a concentration of 0.008 to 0.035 parts by weight, per part of pigment and said cationic surfactant being present in a concentration of 0.06 to 0.27 parts per part of pigment.

2. The system of claim 1, wherein said metal is copper.

3. The system of claim 2, wherein said copper phthalocyanine is a chlorine-substituted copper phthalocyanine having a maximum chlorine content of about 20%, by weight.

4. The system of claim 1, wherein said anionic surfactant is a sodium alkyl aryl sulfonate and said cationic surfactant is a fatty amine condensed with ethylene oxide.

5. The system of claim 1 which contains a 0.5%, by weight, sulfonic acid content and 0.017 and 0.131 parts, by weight, respectively of said anionic and cationic surfactants per part of pigment.

6. The system of claim 1 which also contains an alkaline-earth halide insolubilizing agent for said sulfonated copper phthalocyanine and said anionic surfactant.

7. The system of claim 6, wherein said agent is barium chloride.

8. The system of claim 6 which consists essentially of chlorinated copper phthalocyanine (15%, by weight, chlorine), sulfonated copper phthalocyanine in an amount to provide a 0.5% sulfonic acid, 0.017 parts, by weight, of sodium alkyl aryl sulfonate per part of pigment, 0.131 parts, by weight, of ethoxylated amine surfactant per part of pigment and an insolubilizing amount of barium chloride.

9. A process for producing a coated metal phthalocyanine pigment the steps of (a) intimately contacting a crude unsubstituted or halogen nuclear substituted metal phthalocyanine with concentrated sulfuric acid until a pasty mass is formed; (b) pressing said mass and then reslurrying the presscake with water; (c) neutralizing said slurry by the addition of a base; (d) emulsifying the slurry with an organic solvent-water emulsion; (e) milling the emulsified slurry and exposing the milled material to elevated temperatures; (f) adding sulfonated copper phthalocyanine thereto in an amount sufficient to yield a 0.1–2.0%, by weight, sulfonic acid content; (g) adding 0.008–0.035 parts, by weight, of anionic surfactant and 0.06–0.27 parts, by weight, of cationic surfactant per part of pigment; (h) insolubilizing said sulfonated copper phthalocyanine and said anionic surfactant; and (i) recovering the coated metal phthalocyanine pigment from the slurry.

* * * * *